(12) United States Patent
Primo et al.

(10) Patent No.: US 7,830,994 B2
(45) Date of Patent: Nov. 9, 2010

(54) CHANNEL ESTIMATION SYSTEM AND METHOD

(75) Inventors: Haim Primo, Gane-Tikwa (IL); Yosef Stein, Sharon, MA (US); Wei An, Auburndale, MA (US)

(73) Assignee: Analog Devices, Inc., Norwood, MA (US)

(*) Notice: Subject to any disclaimer, the term of this patent is extended or adjusted under 35 U.S.C. 154(b) by 804 days.

(21) Appl. No.: 11/789,180

(22) Filed: Apr. 24, 2007

(65) Prior Publication Data

US 2008/0095275 A1    Apr. 24, 2008

Related U.S. Application Data

(60) Provisional application No. 60/852,607, filed on Oct. 18, 2006.

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. .................. 375/346; 375/285
(58) Field of Classification Search .......... 375/224, 375/227, 285, 340, 346, 349–350
See application file for complete search history.

(56) References Cited

U.S. PATENT DOCUMENTS

| 6,556,639 | B1 |   | 4/2003  | Goldston et al.            |
| 6,954,421 | B2 |   | 10/2005 | Kuwabara et al.            |
| 7,440,506 | B2 | * | 10/2008 | Atungsiri et al. ... 375/260 |
| 7,583,755 | B2 | * | 9/2009  | Ma et al. ........... 375/316 |
| 7,668,269 | B2 | * | 2/2010  | Ma et al. ........... 375/350 |
| 2002/0097669 | A1 |   | 7/2002  | Kim                     |
| 2005/0163258 | A1 | * | 7/2005  | Gore et al. .......... 375/340 |
| 2005/0213679 | A1 | * | 9/2005  | Yamagata .......... 375/260 |
| 2006/0159188 | A1 | * | 7/2006  | Izumi ............... 375/260 |
| 2008/0192850 | A1 | * | 8/2008  | Mitsugi ............. 375/260 |

* cited by examiner

*Primary Examiner*—Jean B Corrielus
(74) *Attorney, Agent, or Firm*—Goodwin Procter LLP

(57) ABSTRACT

Channel estimation for high mobility OFDM channels is achieved by identifying a set of channel path delays from an OFDM symbol stream including carrier data, inter-channel interference noise and channel noise; determining the average channel impulse response for the identified set of channel path delays in each symbol; storing the average channel impulse responses for the identified channel path delays; generating a path delay curvature for each channel path delay in each symbol based on stored average channel impulse responses for the identified channel path delays; estimating the carrier data in the symbols in the OFDM symbol stream in the presence of inter-channel interference noise and channel noise from the OFDM symbol stream and the average impulse responses for the identified channel path delays; reconstructing the inter-channel interference noise in response to the path delay curvature, the identified set of channel path delays and estimated carrier data; and subtracting the reconstructed inter-channel interference noise from the OFDM symbol stream to produce a symbol stream of carrier data and channel noise with suppressed inter-channel interference noise.

44 Claims, 14 Drawing Sheets

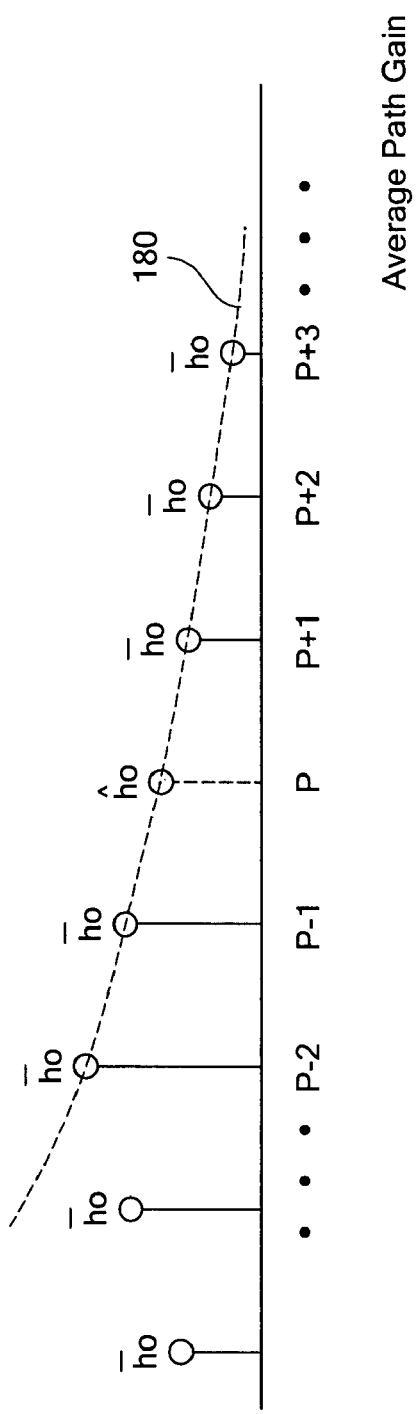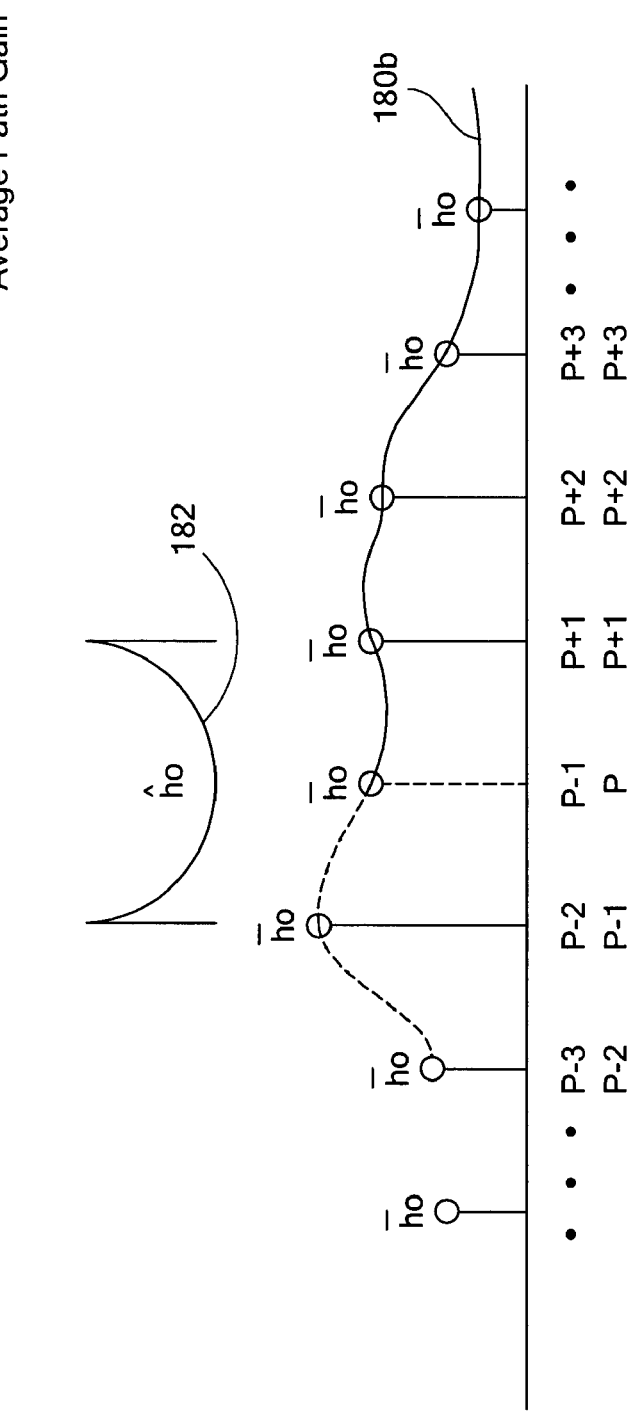
FIG. 8A
FIG. 8B

CHANNEL ESTIMATION SYSTEM AND METHOD

This application claims benefit of and priority to U.S. Provisional Application Ser. No. 60/852,607 filed Oct. 18, 2006 incorporated herein by this reference.

FIELD OF THE INVENTION

This invention relates to an improved channel estimator system and method for high mobility OFDM channels.

BACKGROUND OF THE INVENTION

Binary phase shift keying (BPSK) is a conventional data modulation scheme that conveys data by changing, the phase of a reference carrier signal, for example, during each BPSK symbol period carrier data in the form of either a positive or negative sine wave is transmitted. A positive sine wave represents a data "1", a negative sine wave a data "0". When the symbol stream arrives at the receiver it is decoded by multiplying with a positive sine wave. The multiplying of it by another positive sine wave produces a average positive level; if the symbol period contains a negative sine wave the multiplexing by a positive sine wave produces an average negative level. Orthogonal Frequency Division Multiplexing (OFDM) employs the same idea but instead of one carrier wave per bit, the bit stream to be transmitted is split into several parallel low-rate bit streams, two, ten or any number; presently over 8 k (8192). Each low-rate bit stream is transmitted over one sub-channel by modulating a sub-carrier using a standard modulation scheme, for example BPSK. The sub-carrier frequencies are chosen so that the modulated data streams are orthogonal to each other. The demodulation at the receiver is done in the same way with the symbol period sine waves being multiplied selectively by a positive sine wave of each of the frequencies transmitted. By virtue of orthogonality it is possible to distinguish between the various carrier sine waves. OFDM is thus a much higher density data encoding technique. OFDM has shortcomings but works well especially where the transmitter and received are fixed or not moving fast with respect to each other and so the transmitter channel between them remains constant or fairly constant. That is, the amplitude and phase of the various sine waves transmitted over that channel within a symbol period do not vary significantly over the symbol period. However in high mobility situations where the channel does change over the time of a symbol period, e.g. video streaming to a receiver on a moving vehicle or train, different sine waves can experience different channel paths resulting in variations in their phase and/or amplitude. Such variations referred to as inter-carrier or inter-channel interference (ICI) noise interferes with the orthogonality of the sine waves and can cause errors in the data decoding causing "1"s to appear to be "0"s and "0"s to appear as "1"s. This ICI noise accompanies but is different then the conventional channel noise that accompanies the carrier data.

BRIEF SUMMARY OF THE INVENTION

It is therefore an object of this invention to provide an improved estimator system and method for high mobility OFDM channels.

It is a further object of this invention to provide such an improved estimator system and method which makes efficient use of memory and power.

It is a further object of this invention to provide such an improved estimator system and method which is power adaptive to channel conditions.

The invention results from the realization that a channel estimation for high mobility OFDM channels can be achieved by identifying a set of channel path delays from an OFDM symbol stream including carrier data, inter-channel interference noise and channel noise; determining the average channel impulse response for the identified set of channel path delays in each symbol; storing the average channel impulse responses for the identified channel path delays; generating a path delay curvature for each channel path delay in each symbol from the stored average channel impulse responses for the identified channel path delays; estimating the carrier data in the symbols in the OFDM symbol stream in the presence of inter-channel interference noise from the OFDM symbol stream and said average impulse responses for the identified channel path delays; reconstructing the inter-channel interference noise in response to the identified set of channel path delays and estimated carrier data; and subtracting the reconstructed inter-channel interference noise from the OFDM symbol stream to produce a symbol stream of carrier data and channel noise with suppressed inter-channel interference noise.

The subject invention, however, in other embodiments, need not achieve all these objectives and the claims hereof should not be limited to structures or methods capable of achieving these objectives.

This invention features a channel estimator system for high mobility OFDM channels including a path delay estimator circuit, responsive to an OFDM symbol stream including carrier data, inter-channel interference noise and channel noise for identifying a set of channel path delays and an average channel estimator circuit, responsive to the OFDM symbol stream and the identified set of channel path delays, for determining the average channel impulse response for the identified set of channel path delays in each symbol. A storage circuit stores the average channel impulse responses for the identified channel path delays and a curve generator circuit, responsive to the stored average channel impulse responses, generates a path delay curvature for each channel path delay in each symbol. There is a carrier data estimator circuit, responsive to the OFDM symbol stream and the average impulse responses from the average channel estimator circuit, for estimating the carrier data in the symbols in the OFDM symbol stream in the presence of inter-channel interference and channel noise and a regenerator circuit, responsive to the curve generator, and path delay estimator circuit and carrier data estimation circuit, for reconstructing the inter-channel interference noise. A subtraction circuit subtracts the reconstructed inter-channel interference noise from the OFDM symbol stream resulting in a symbol stream of carrier data and channel noise with suppressed inter-channel interference noise.

In a preferred embodiment the path delay estimator circuit may identify a set of channel path delays which are above a predetermined energy threshold. The regenerator circuit may include a local OFDM symbol generator, responsive to the estimated carrier data from the carrier estimator circuit to generate, locally, OFDM symbol replicas. The regenerator circuit may include an ICI distortion generator for shifting an OFDM symbol replica by each associated channel path delay, multiplying it by the associated path delay curvature and summing the shifted, multiplied symbol replicas to produce local inter-channel interference noise. The curve generator circuit may include a selection circuit for selecting from the storage circuit the average channel gains of neighboring OFDM symbols. The curve generator circuit may include a rate determining circuit for determining the rate of change of the neighboring average channel gains. The curve generator circuit may include a model selection circuit for identifying a best fit average curve for the stored channel impulse responses. The carrier data estimator circuit may include an FFT circuit for performing FFT on a received OFDM symbol. The carrier data estimator circuit may include a vector generating circuit for creating a vector with zeros and inserting average path gains in associated delay locations. The carrier data estimator circuit may include a second FFT circuit for performing FFT on the vector. The carrier data estimator circuit may include an averaging circuit for calculating noise level. The carrier data estimator circuit may include an equalization circuit for calculating equalization coefficients in response to the second FFT circuit and the averaging circuit and applying them to the associated symbol. The carrier data estimator circuit may include a slicer circuit for matching the equalized symbols to a predefined grid of levels. The path delay estimator circuit may include an FFT circuit for performing FFT on an OFDM symbol. The path delay estimator circuit may include a normalizing circuit for extracting the channel frequency response for known carriers and inserting zeros for unknown carriers. The path delay estimator circuit may include an IFFT for performing IFFT on the channel frequency response. The path delay estimator circuit may include a noise estimator circuit for determining the channel noise level. The path delay estimator circuit may include a threshold setting circuit for setting a threshold for groups of channel path delays in accordance with their energy levels. The path delay estimator circuit may include a threshold circuit for selecting channel path delays meeting a predetermined threshold. The average channel estimator circuit may include an FFT circuit for performing an FFT on an OFDM symbol. The average channel estimator circuit may include a normalizing circuit for extracting the channel frequency response for known carriers. The average channel estimator circuit may include an estimator circuit for determining average path gains based on least squares and known noise.

This invention also features a channel estimation method for high mobility OFDM channels including identifying a set of channel path delays from an OFDM symbol stream including carrier data, inter-channel interference noise and channel noise; determining the average channel impulse response for the identified set of channel path delays in each symbol; storing the average channel impulse responses for the identified channel path delays; generating a path delay curvature for each channel path delay in each symbol based on stored average channel impulse responses for the identified channel path delays; estimating the carrier data in the symbols in the OFDM symbol stream in the presence of inter-channel interference noise and channel noise from the OFDM symbol steam and the average impulse responses for the identified channel path delays; reconstructing the inter-channel interference noise in response to the path delay curvature, the identified set of channel path delays and estimated carrier data; and subtracting the reconstructed inter-channel interference noise from the OFDM symbol stream to produce a symbol stream of carrier data and channel noise with suppressed inter-channel interference noise.

In a preferred embodiment the identified set of channel path delays may be above a predetermined level of energy. Reconstructing the inter-channel interference noise may include generating, locally, OFDM symbol replicas from the estimated carrier data. Reconstructing the inter-channel interference noise may further include shifting an OFDM symbol replica by each associated channel path delay, multiplying it by the associated path delay curvature and summing the shifted, multiplied symbol replicas to produce local inter-channel interface noise. Generating a path delay curvature may include averaging the channel gains of neighboring OFDM symbols. Generating a path delay curvature may further include determining the rate of change of the neighboring average channel gains. Generating a path delay curvature may further include identifying a best fit average free curve for the stored channel impulse responses. Estimating the carrier data may include performing FFT on a received OFDM symbol. Estimating the carrier data may further include creating a vector with zeros and inserting average path gains in associated delay locations. Estimating the carrier data may further include performing FFT on the vector. Estimating the carrier data may further include calculating noise level. Estimating the carrier data may further include calculating equalization coefficients in response to the second FFT and applying them to the associated symbol. Estimating the carrier data may further include matching the equalized symbols to a predefined grid of levels. Identifying a set of path delays may include performing FFT on an OFDM symbol. Identifying a set of path delays may further include extracting the channel frequency response for known carriers and inserting zeros for unknown carriers. Identifying a set of path delays may further include performing IFFT on the channel frequency response. Identifying a set of path delays may further include determining the channel noise level. Identifying a set of path delays may further include setting a threshold for groups of channel path delays in accordance with their energy levels. Identifying a set of path delays may further include selecting channel path delays meeting a predetermined threshold. Determining the impulse response may include performing an FFT on an OFDM symbol. Determining the impulse response may further include a extracting the channel frequency response for known carriers. Determining the impulse response may further include determining average path gains based on least squares and known noise.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 8A is a graphical illustration of curve modeling and filtering operation, referred to in FIG. 8;

FIG. 8B is a graphical illustration of a high-order curve modeling and filtering operation, referred to in FIG. 8;

DETAILED DESCRIPTION OF THE INVENTION

Figure 1:
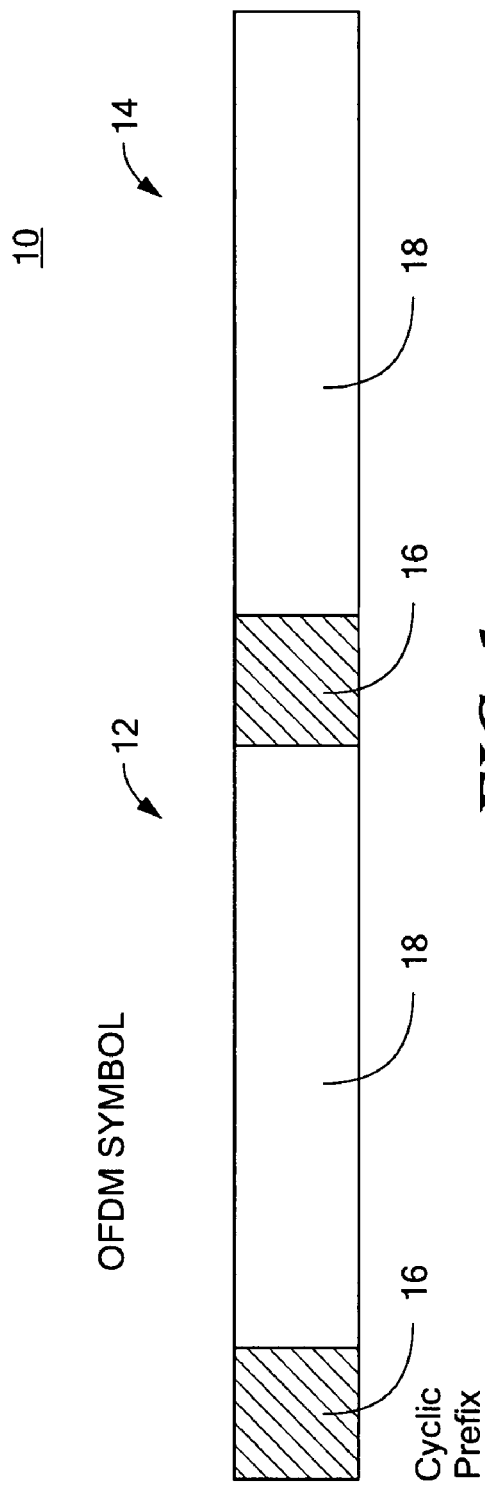
FIG. 1 is a schematic, time domain, representation of two OFDM symbols.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
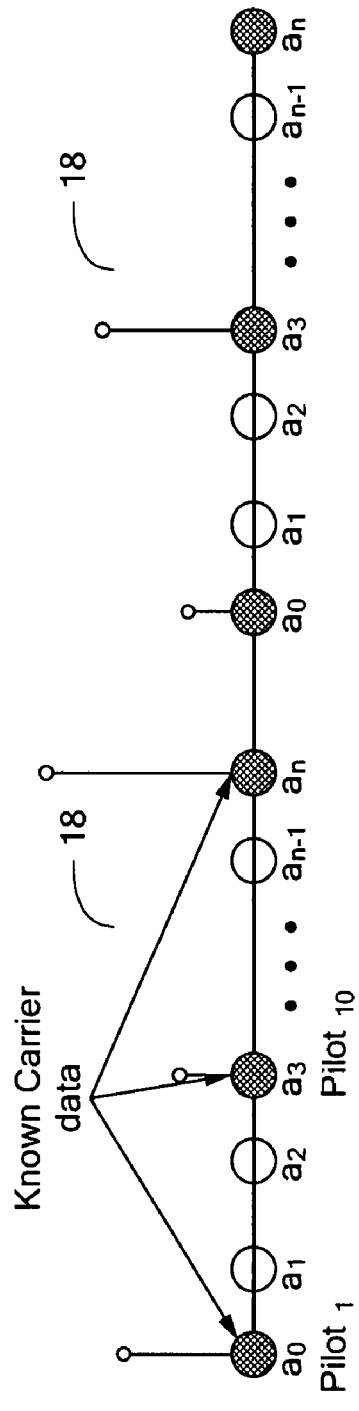
FIG. 2 is a schematic, frequency domain, representation of the OFDM symbols of FIG. 1.
Figure 3:
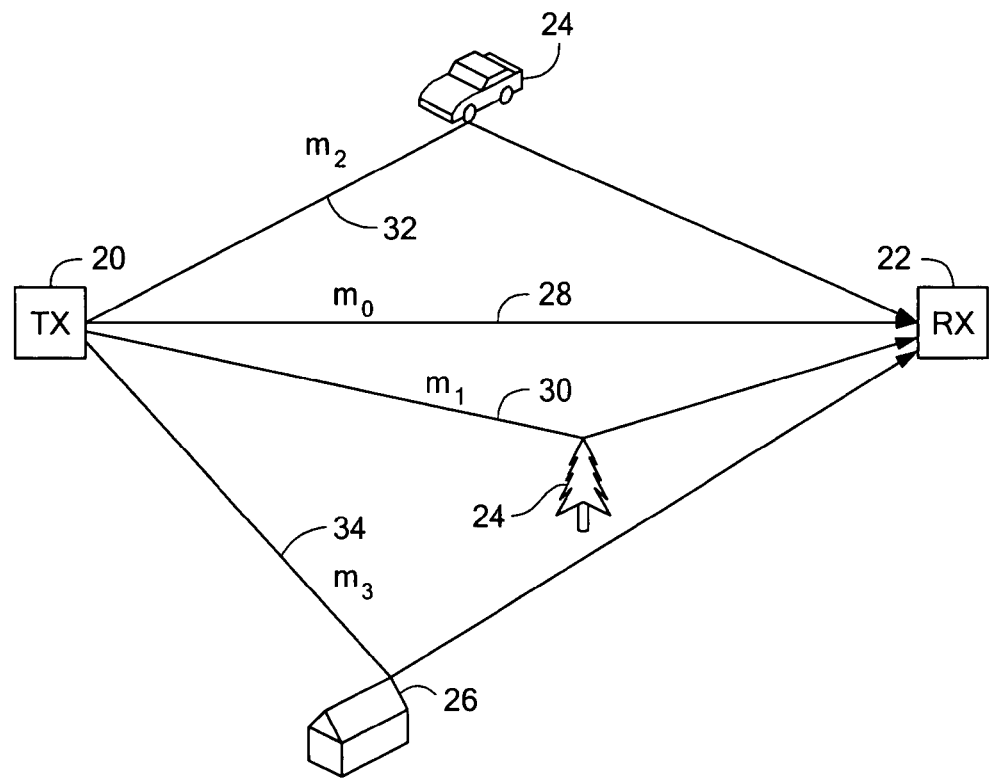
FIG. 3 is a schematic diagram showing an example of multiple paths occurring in a channel between a transmitter and receiver.
Figure 3A:
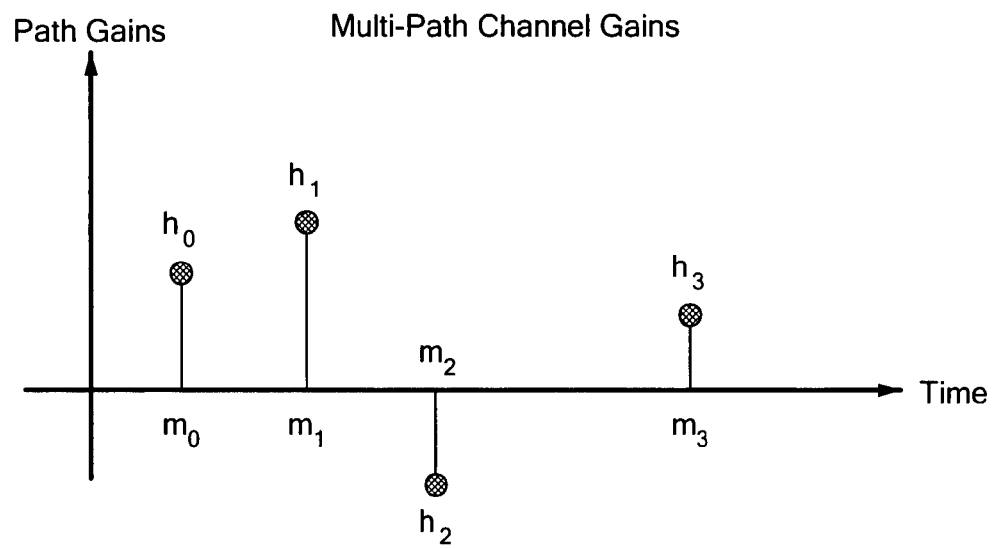
FIG. 3A is a graphical illustration of the gain and delay associated with each path in FIG. 3.

There is shown in FIG. 1 an OFDM symbol stream 10 including two symbols 12 and 14 each of which includes a cyclical prefix section 16 and carrier data section 18. Each carrier data section 18, FIG. 2, includes a plurality of carrier data $a_0, a_1, a_2, a_3 \text{-} a_{n-1}, a_n$ where the filled circles represent pilot carrier data whose amplitude and phase are known and the empty circles represent unknown carrier data. The OFDM symbol stream is typically propagated along a channel from a transmitter 20, FIG. 3, to a receiver 22. Because of reflection from objects 24 in the area the channel may have multiple paths, the most direct path 28 with a phase of $m_0$ and additional paths 30, 32, and 34 having phases of $m_1, m_2, m_3$, respectively. Each path has its own gain or attenuation as shown in FIG. 3A, where each path has associated it with it a gain or amplitude $h_0, h_1, h_2, h_3$, and an associated phase shift $m_0, m_1, m_2, m_3$. If the transmitter 20 and 22 move relatively fast with respect to one another, inter-channel interference (ICI) noise develops due to the loss of orthogonality because the carrier data sine wave arrives at the receiver 22 along four paths with different phases and different amplitudes. This can result in inaccuracies in determining the nature of the data, possibly reading ones as zeros and zeros as ones.

In accordance with this invention the inter-channel interference (ICI) noise is suppressed by generating a replica ICI noise function and subtracting it from the signal in channel noise: thus where the incoming signal is represented by S+f (S)+n where S is the OFDM carrier data, f(S) is the ICI noise and N is the general channel noise this invention contemplates the generation of a replica ICI noise f'(S) and subtracting it from the incoming signal S+f(S)+n resulting in an output of simply S+n.

Figure 4:
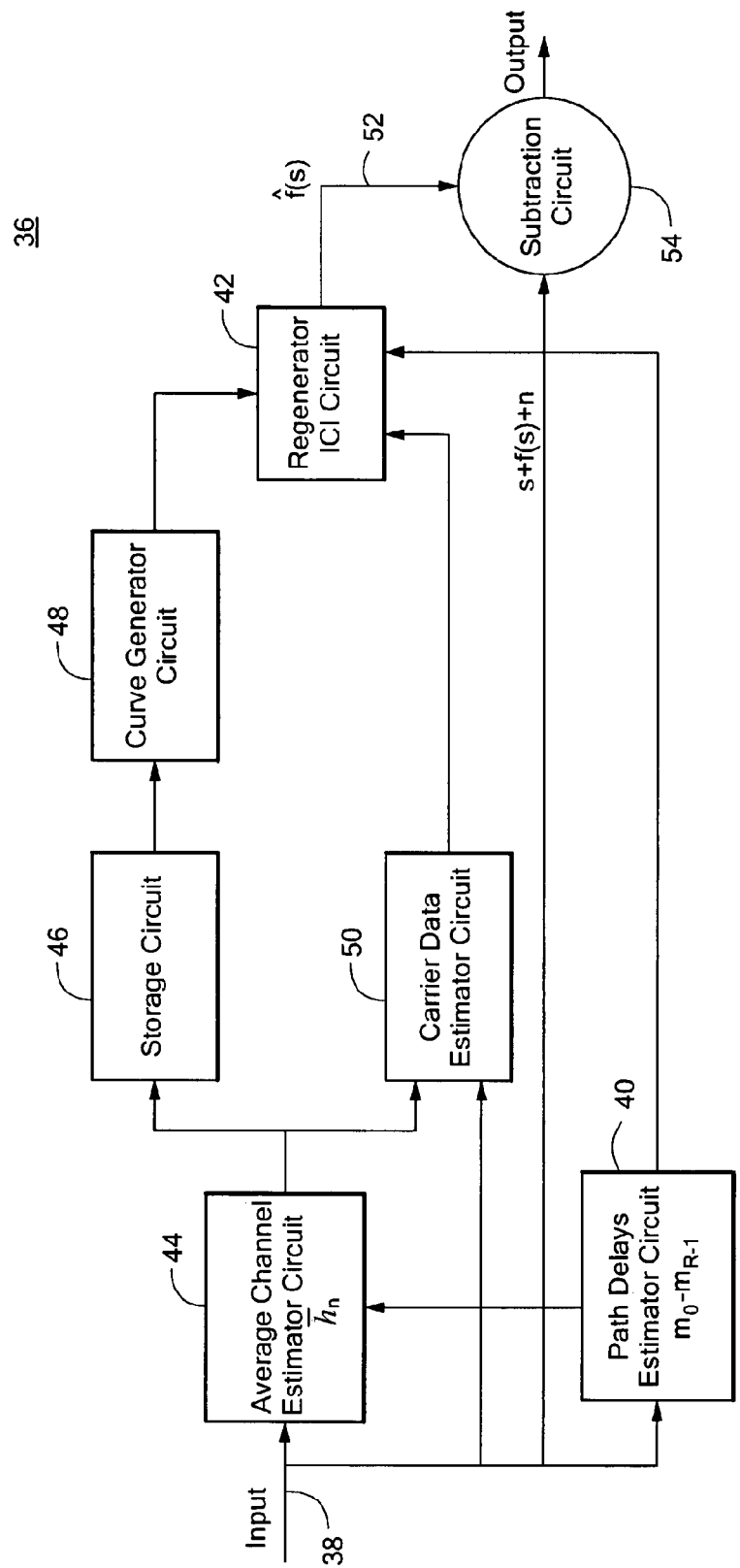
FIG. 4 is a schematic block diagram of one embodiment of a channel estimator system according to this invention.

In one embodiment, FIG. 4, channel estimator 36 according to the invention includes a path delay estimator circuit 40 which responds to OFDM symbol stream 38 and estimates the path delays $m_0\text{-}m_n$; the certain identified ones of the estimated path delays are delivered both to ICI regenerator circuit 42 and average channel estimator circuit 44. Average channel estimator circuit 44 responds to the identified set of channel path delays from path delay estimator circuit 40 and the OFDM symbol stream on line 38 and determines the average channel impulse response $\bar{h}_0, \bar{h}_1, \ldots, \bar{h}_n$ for the identified set of channel path delays in each symbol. Those average channel impulse responses for the identified channel path delays are stored in storage circuit 46 and then used by curve generator circuit 48 to generate a path delay curvature for each channel path delay in each symbol. Carrier data estimator circuit 50 also responds to the average impulse responses from the average channel estimator circuit and the OFDM symbol stream on input line 38 to locally estimate the carrier data (a0, a1, ... an) in the OFDM symbol stream in the presence of inter-channel interference and channel noise. Regenerator ICI circuit 42 responds to the locally produced estimated carrier data from carrier data estimator circuit 50 and the path delay curvature for each channel path delay for curve generator circuit 48 and adjusts their phase in accordance with the path delay estimator circuit output 40 to reconstruct a replica ICI noise. This replica ICI noise on line 52 is then subtracted from the incoming OFDM symbol stream on line 38 in subtraction circuit 54 resulting in a symbol stream of carrier data and channel noise with suppressed inter-channel interference noise.

Channel estimator system 36 in one embodiment may be constructed using a programmable device such as a Digital Signal Processor (DSP) programmed to operate as indicated in FIGS. 5-9.

Figure 5:
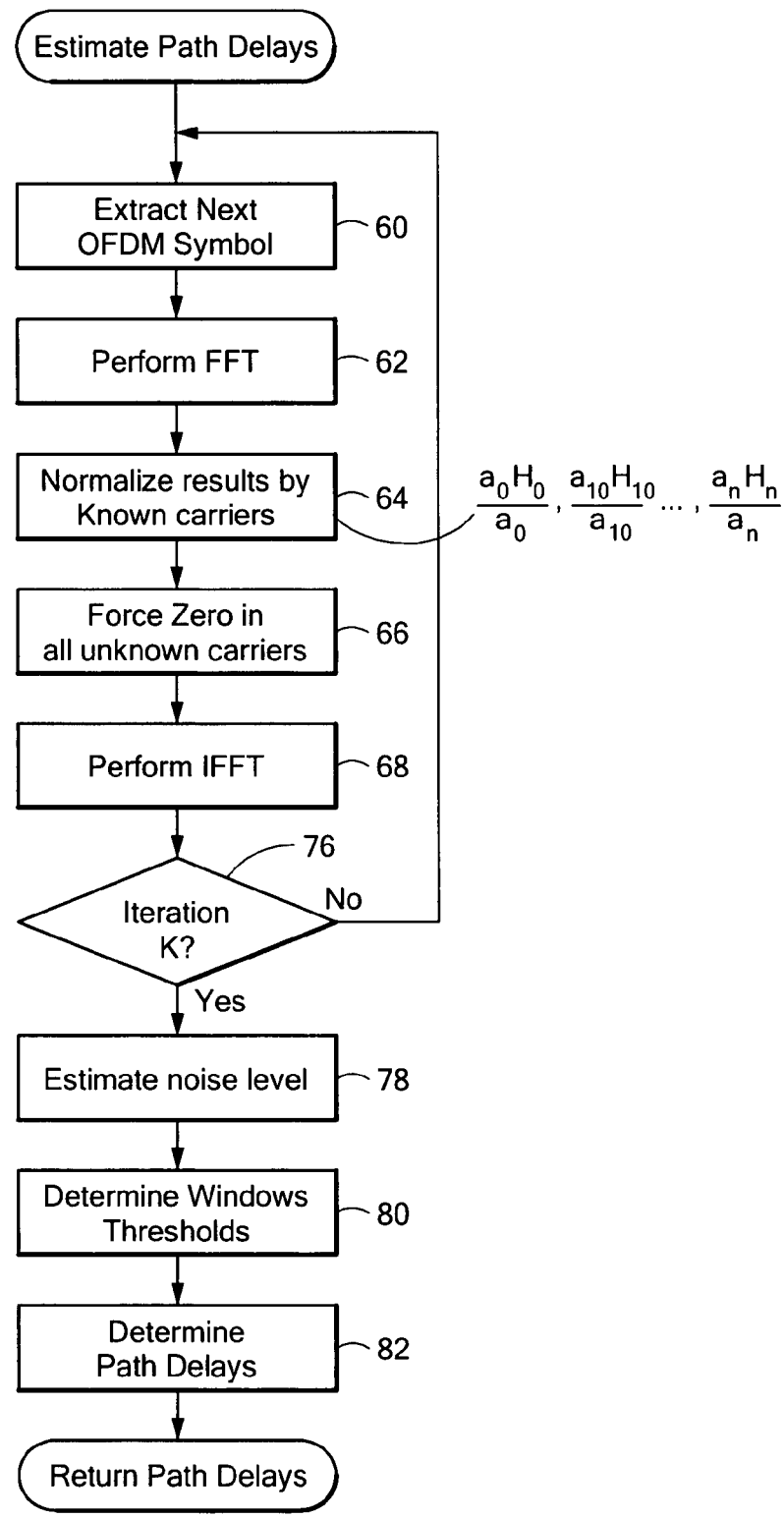
FIG. 5 is a diagram of a flow chart of the path delay estimator circuit of FIG. 4.
Figure 5A:
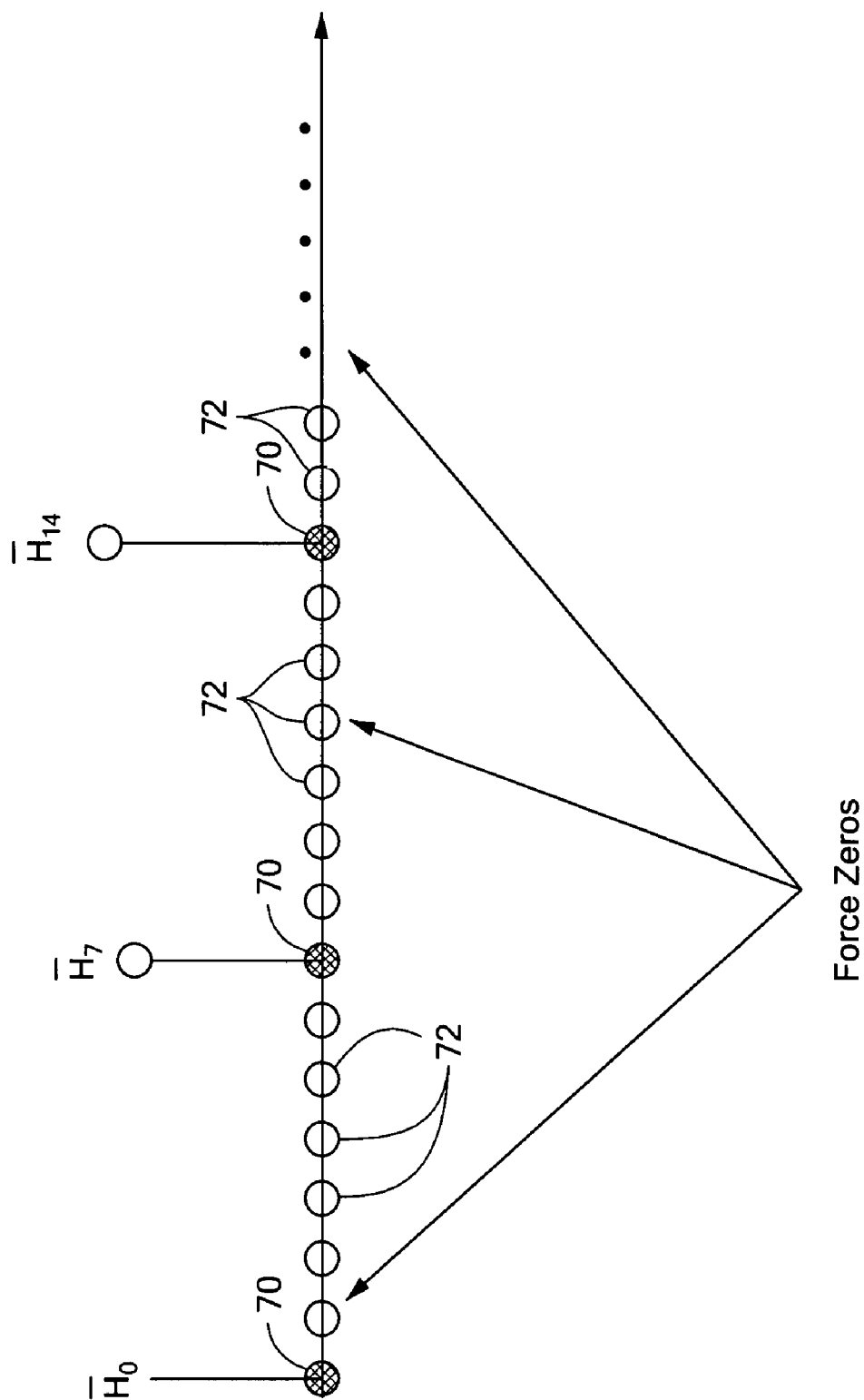
FIG. 5A is a graphical illustration of the forcing of zeros in the unknown data carriers, referred to in FIG. 5.

Path delay estimator circuit 40. FIG. 5, first extracts the next OFDM symbol 60 and a Fast Fourier Transform (FFT) 62 is performed. The results are then normalized in a normalizing circuit using the known carriers. Thus, where, for example, a known carrier data $a_0$ is known and its frequency response $H_0$ can be determined, the carrier can be normalized by dividing $a_0H_0$ by the known $a_0$ to obtain the channel frequency response $H_0$ alone 64. Zero's are now forced in positions of all the unknown carriers 66 as shown graphically in FIG. 5A; the known or pilot carriers are shown as filled circles 70; the empty circles 72 represent the unknown carriers in which the zeros are forced, and the inverse fast Fourier transform (IFFT) 68 is performed. This is done for a number of iterations, K, over a number of symbols to obtain an average $H_0$ and successively an average $H_1, H_2, H_3$. The noise level is then estimated in a noise estimator circuit 78 to determine the channel noise level. After the Kth iteration, 76, the noise level 78 is estimated and then a window including a group of channel impulse responses are monitored to determine their energy level and accordingly a threshold is set for the particular group 80. Then those channel impulse responses above the threshold level are identified and become the identified set of channel path delays 82. This is shown more graphically in FIG. 5B where, for example, channel impulse responses 90, 92, 94 and 96 are viewed in window 98 to determine the energy level of that group of impulse responses 90-96. Based on that energy level a first threshold level 100 is set. The noise level is shown at 102. Anything above threshold 100 is then selected as the identified channel path delays and the delays $m_o, m_1, m_2, m_3$ can be determined. In a second group 104, 106, 108, 110, viewed through a second window 112, a lower energy is detected resulting in a second lower threshold 114 being set.

Figure 6:
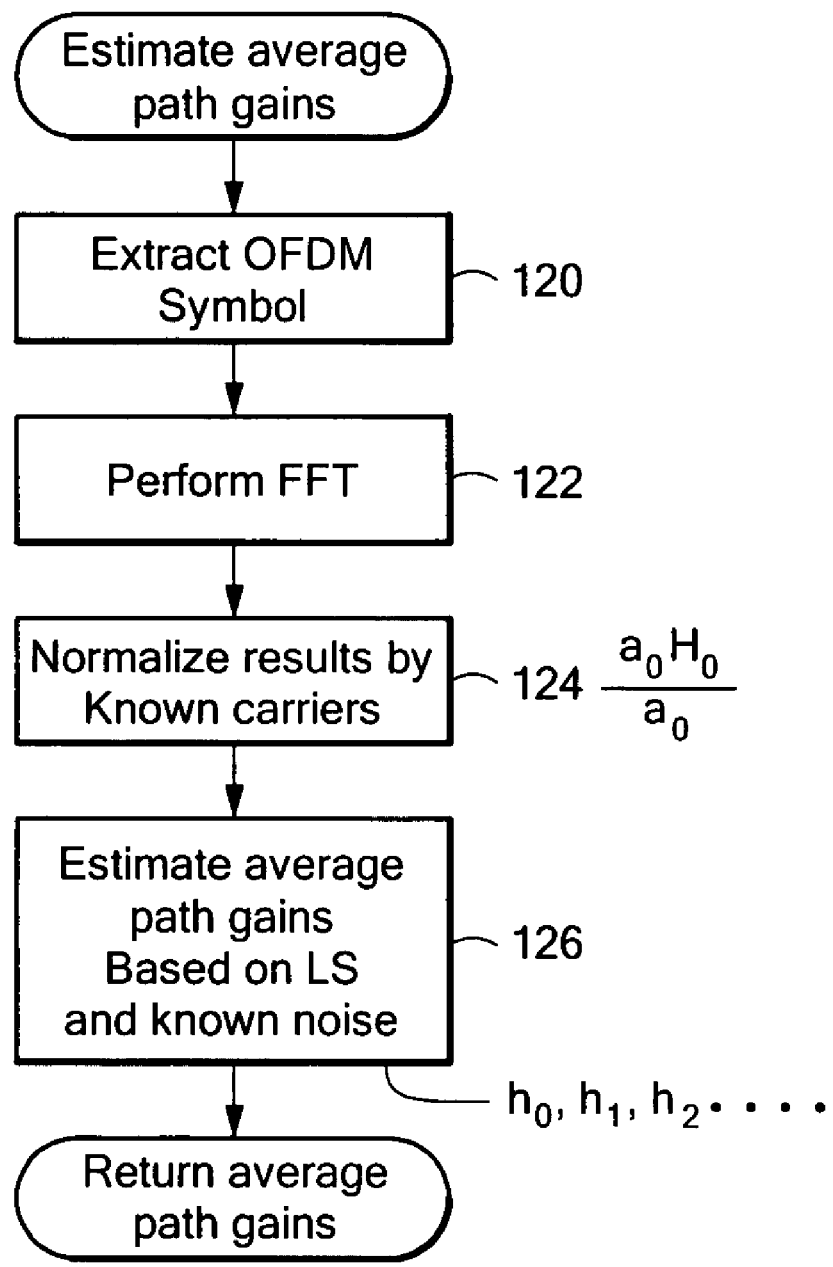
FIG. 6 is a diagram of a flow chart of the average channel estimator circuit of FIG. 4.

Average channel estimator 44, FIG. 6, begins by extracting the OFDM symbol 120 and then performing FFT on it, 122.

Figure 5B:
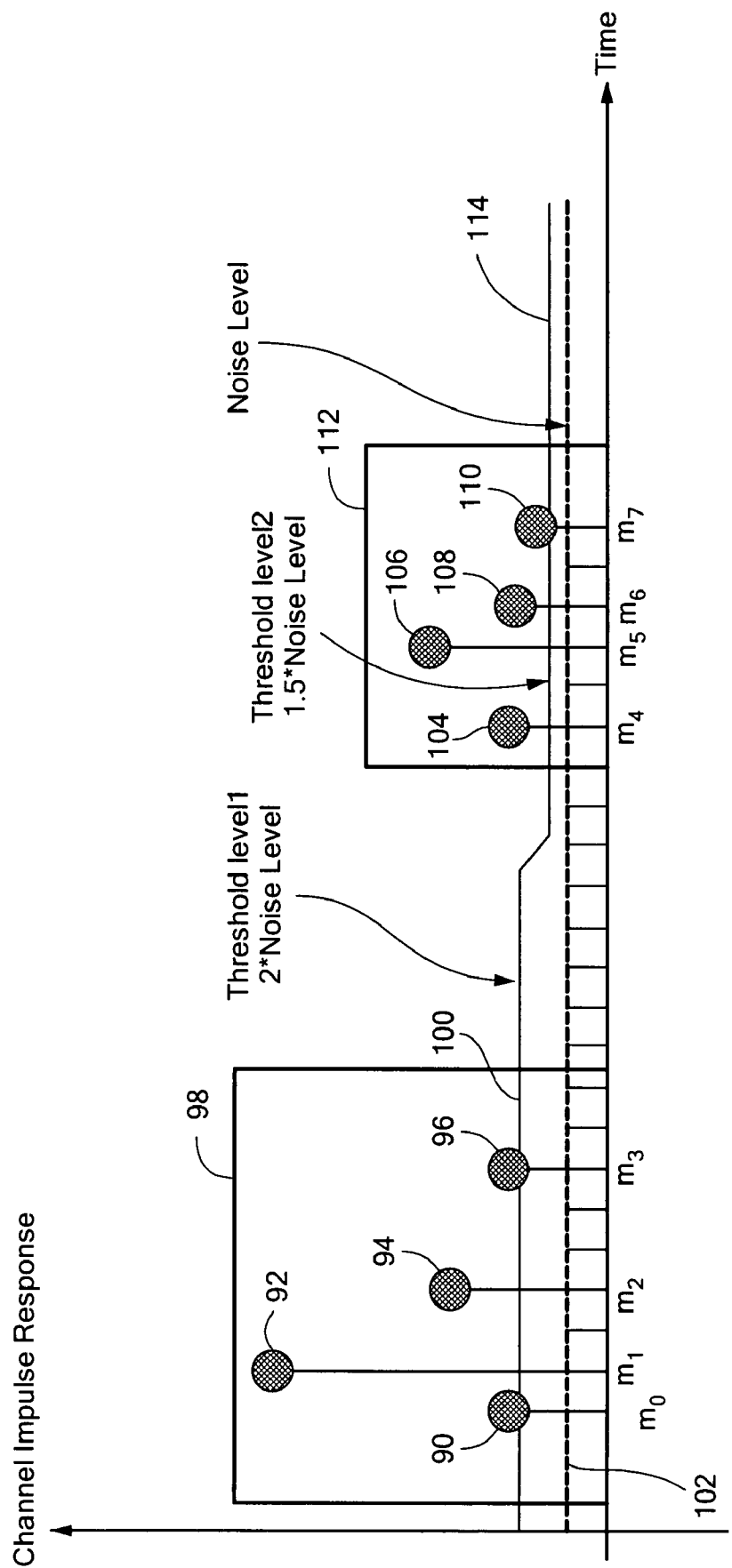
FIG. 5B is a graphical illustration of the windowing and thresholding of the channel impulse responses, referred to in FIG. 5.
Figure 7:
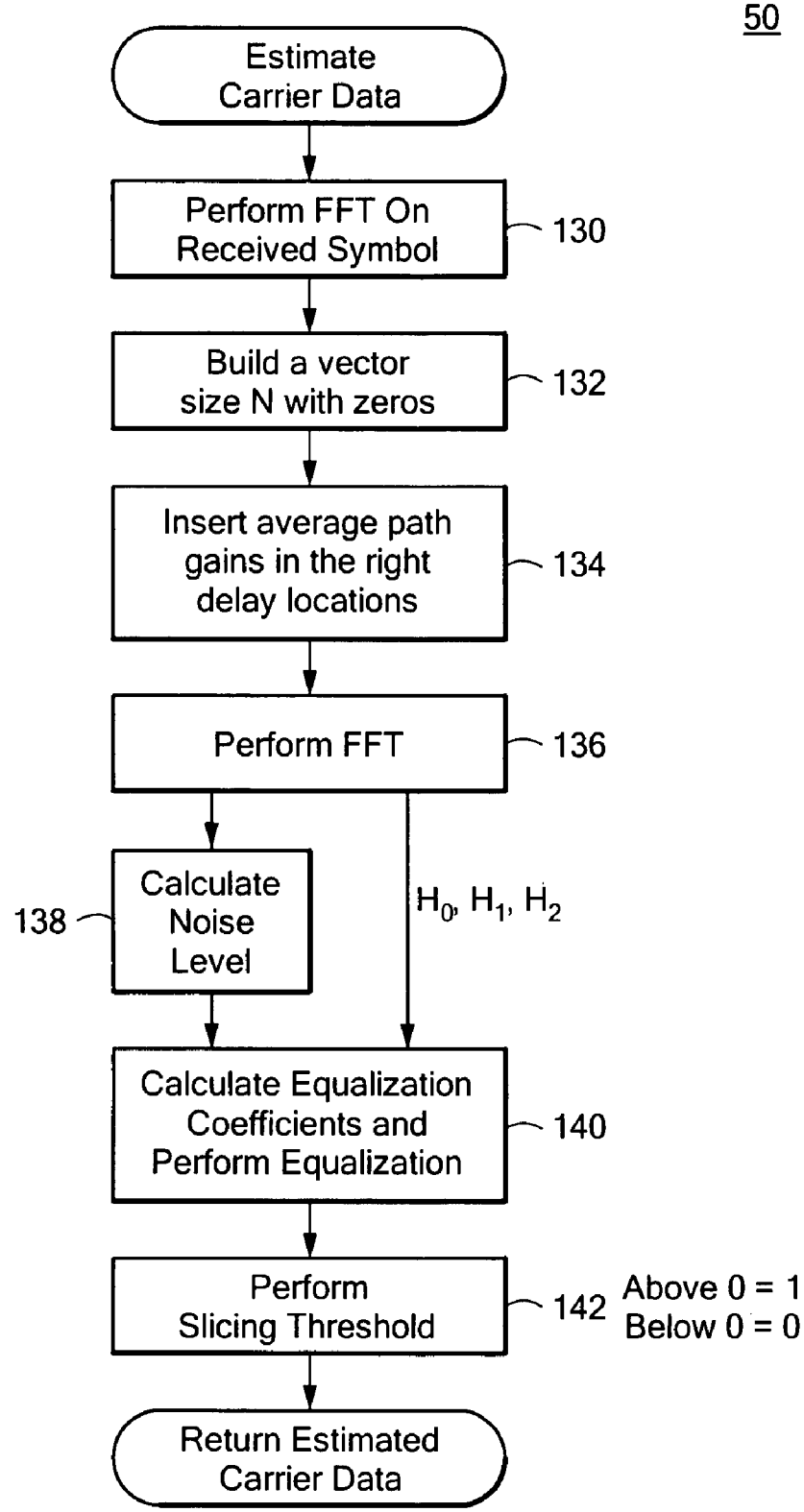
FIG. 7 is a diagram of a flow chart of the carrier data estimator circuit of FIG. 4.
Figure 7A:
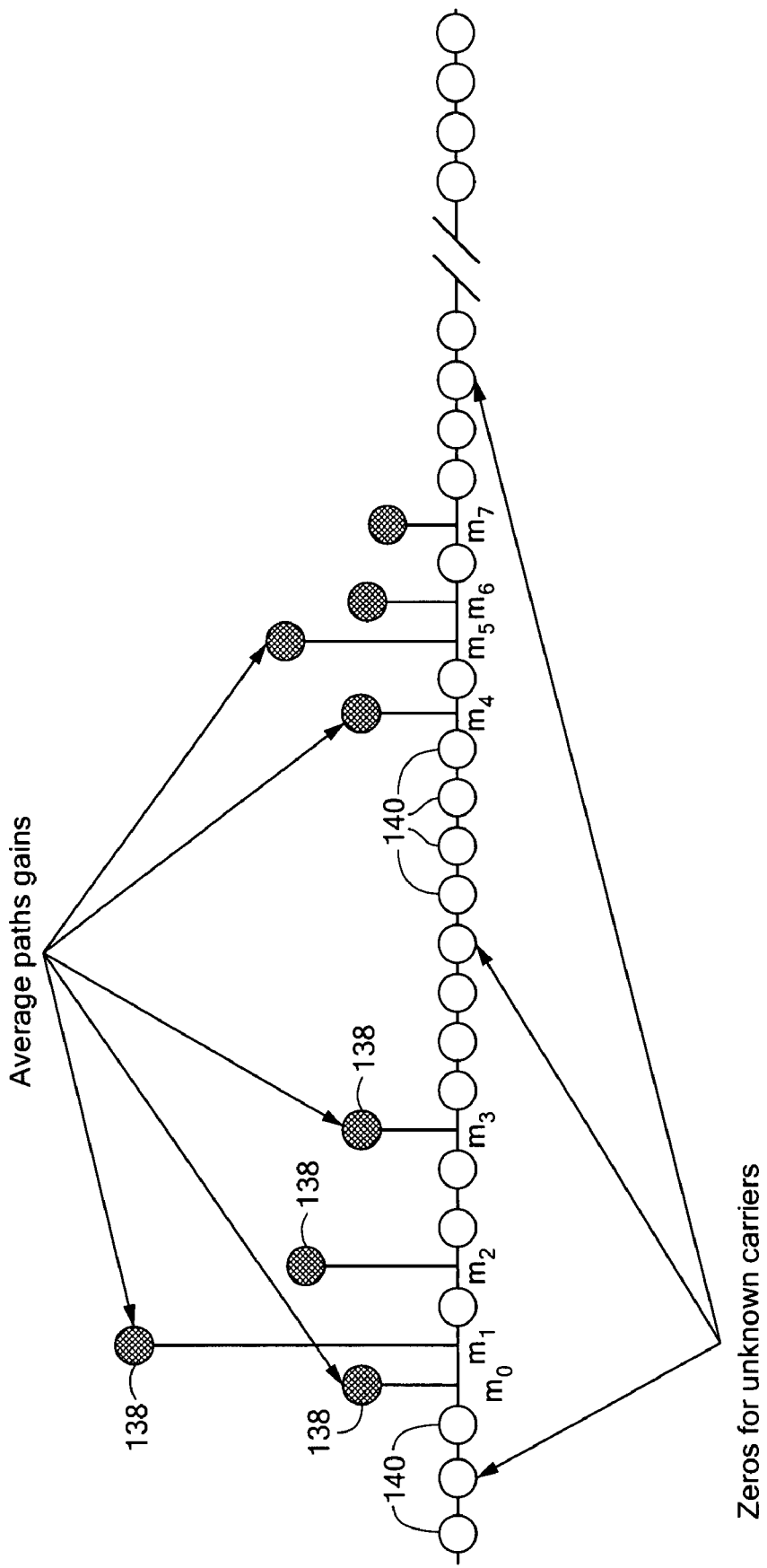
FIG. 7A is a graphical illustration of the insertion of average path gains and zeros for unknown carriers in an N size vector, referred to in FIG. 5.
Figure 7B:
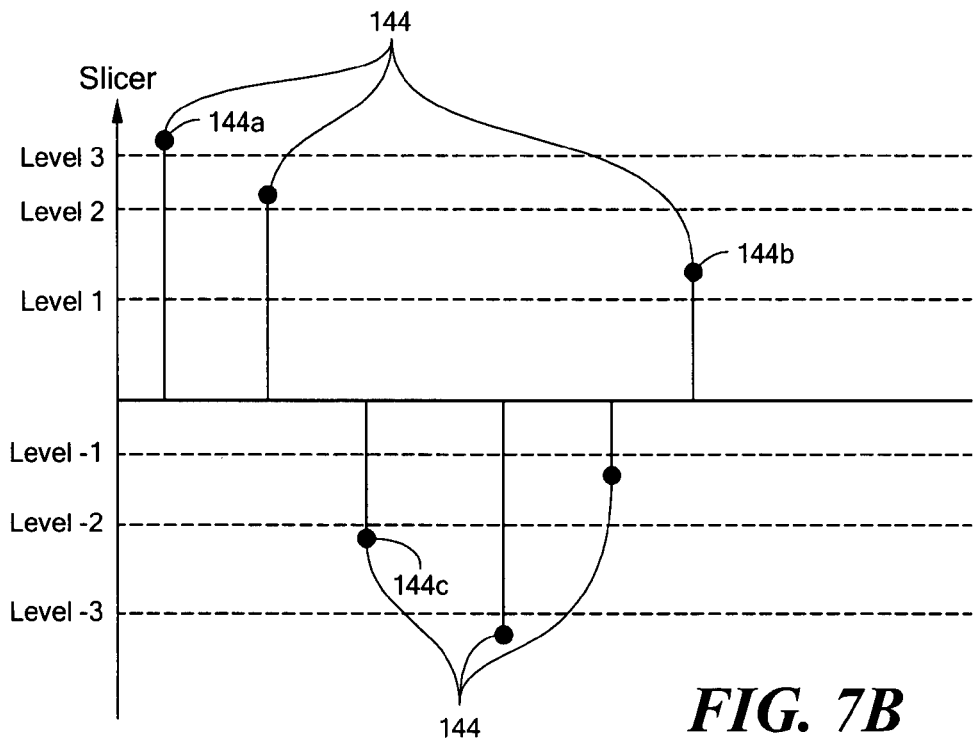
FIG. 7B is a graphical illustration of the slicing of equalized data to set thresholds, referred to in FIG. 7.

The results are normalized by known carriers, step 124, in the same way as previously, where the known carrier, $a_0$, accompanied by the frequency response, $H_0$, is normalized by being divided by $a_0$ to obtain the frequency response $H_0$. The average path gains such as 90-96 shown in FIG. 5B are then estimated 126 using the Least Squares (LS) model and the known noise. Carrier data estimator circuit 50, FIG. 7, may be implemented by performing an FFT 130 on a received OFDM signal, then building a vector size N with zeros 132 and average path gains 134 inserted in the proper delay locations. This is shown in greater detail in FIG. 7A where the average path gains are shown at 138 and the unknown carriers which receive the zero insertions are shown at 140. Following the insertion of the average path gains FFT is performed 136 to obtain the channel frequency response $H_0$, $H_1$ .... The noise level is again calculated 138 using an averaging circuit based on $H_0$, $H_1$, $H_2$ ... and the pilot carriers. After this the equalization coefficients $$\frac{1}{H_0}, \frac{1}{H_1}, \cdots \frac{1}{H_n}$$

are calculated using an equalization circuit and equalization is performed 140. This can be done using the minimum mean square error (MMSE) method which is well known in the art. After this, slicing is performed 142 to match the equalized values to a predefined grid of level. For example, as shown in FIG. 7B, there are a grid of levels +1, +2, +3, −1, −2, −3, and the equalized data 144 are assigned to thresholds consistent with their levels: equalized data 144a is assigned level three, while equalized data 144b is assigned level 1, equalized data 144c is assigned level −2.

Figure 8:
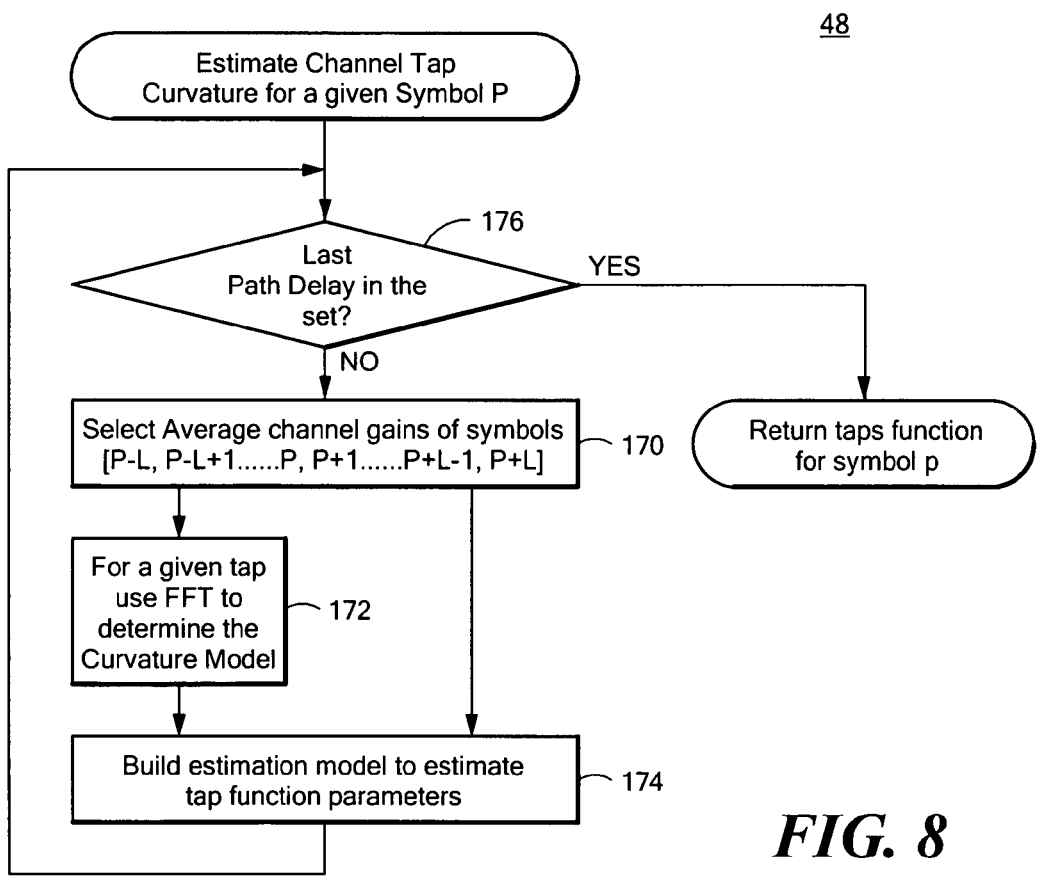
FIG. 8 is a diagram of a flow chart of the curve generator estimator circuit of FIG. 4.

Curve generator circuit 48 may be implemented as shown in FIG. 8. Initially the average channel gains of the selected symbol P and neighboring symbols P+1, P+2. P−1, P−2 ... are retrieved, selected using a selection or addressing circuit 170 from storage 46. The curvature model is then determined using an FFT operation 172 and an estimation model is built 174 to estimate the tap function parameters. For example, if the best estimate is a line the model would be ax+b, if it were a parabola it would be $ax^2+bx+c$, a third order curve it would be $ax^3+bx^2+cx+d$. After the estimation the system returns to inquire whether the last path delay in the set has been processed 176. If it has the routine is finished. If not it returns to retrieve average channel gain symbols 170 from storage 46. A selection circuit performs the retrieving of the average channel gains in 170 and the FFT operation 172 functions as a rate determining circuit for determining the rate of change of the neighboring average channel gains. Model selection is accomplished by building the estimation model 174. The operation is shown graphically in FIG. 8A where the instant symbol P has average channel response $\bar{h}_0$ along with the neighboring symbols P+1, P+2, P+3 ... P−1, P−2 ... in order to obtain an indication of the best fit average free curve 180. In this case a first order or straight line best fit is indicated. In FIG. 8B, however, the curve 180b changes at a much higher rate and so it requires a higher order best fit average free curve, for example, a parabolic shape 182 whose average should be equal to the average channel response of the symbol P. The order of the best fit curve thus depends upon the rate of change of the average channel gain as determined by the FFT operation 172.

Figure 9:
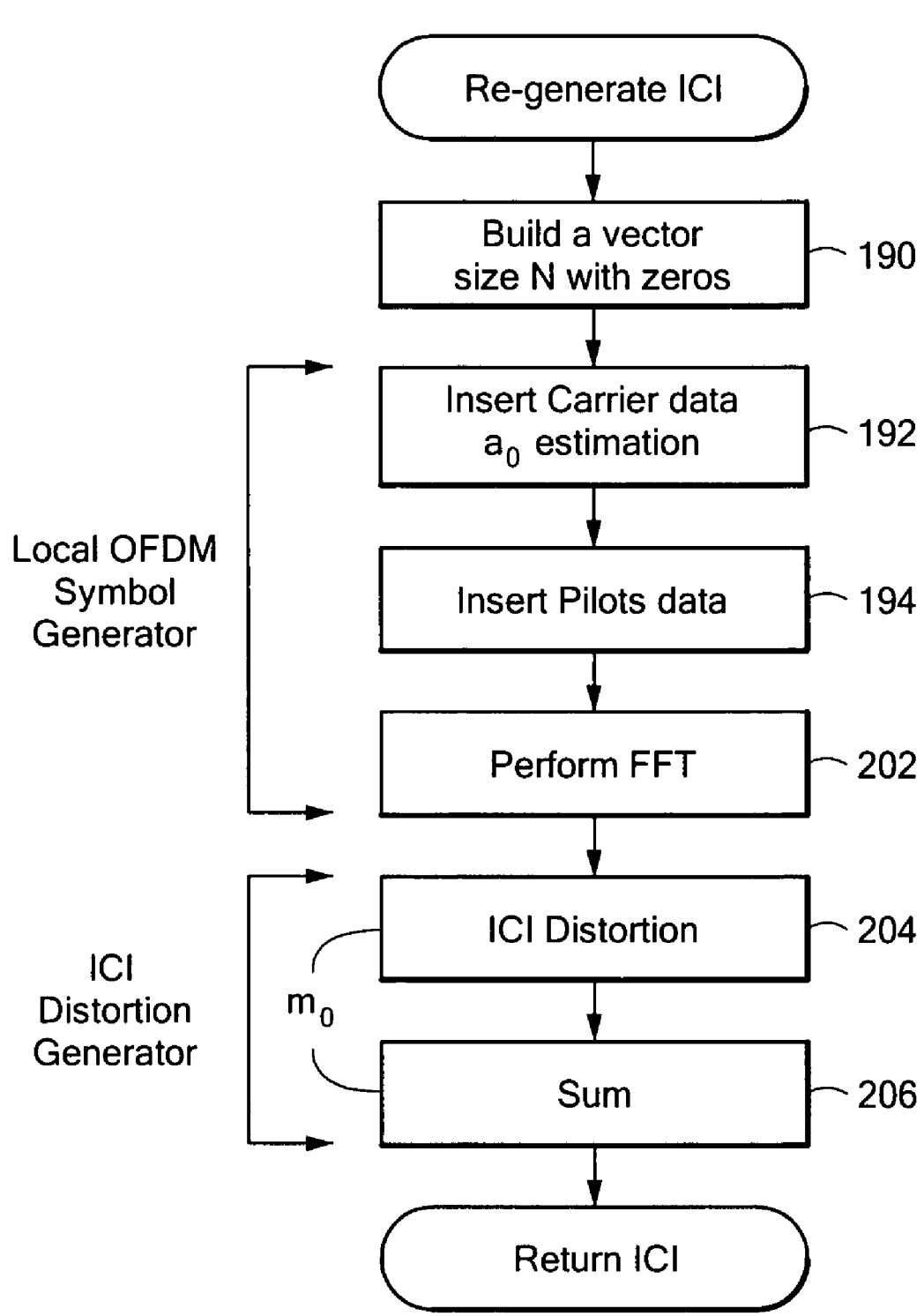
FIG. 9 is a diagram of a flow chart of the regenerator ICI circuit of FIG. 4.

Regenerator ICI circuit 42 may be implemented, FIG. 9, by building a vector size N with zeros 190 and then inserting carrier data $a_0$ estimation 192 and inserting the pilot data 194.

Figure 9A:
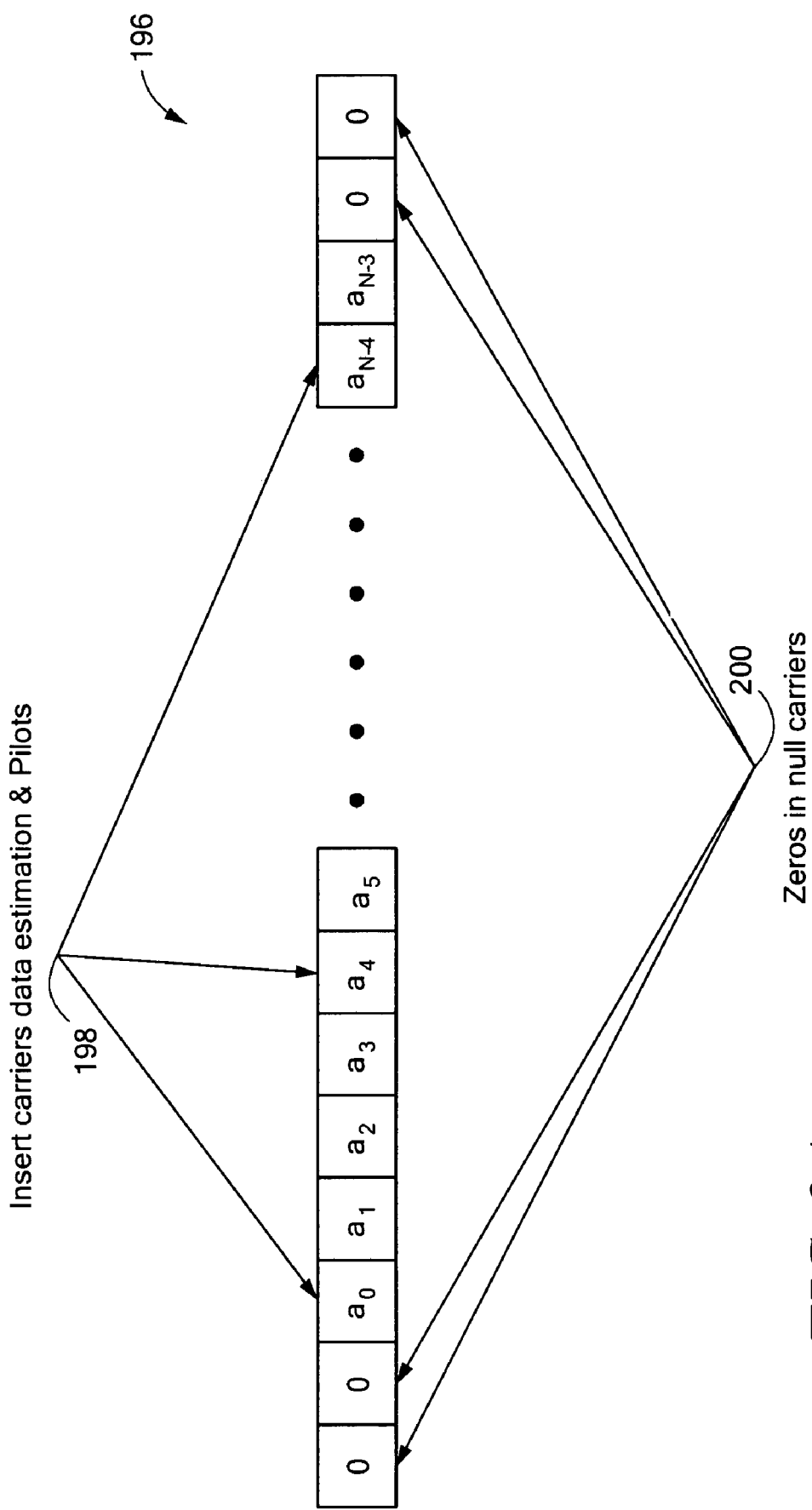
FIG. 9A a graphical illustration of the building of an N size vector and insertion of carrier data estimation, pilots and zeros, referred to in FIG. 9.
Figure 9B:
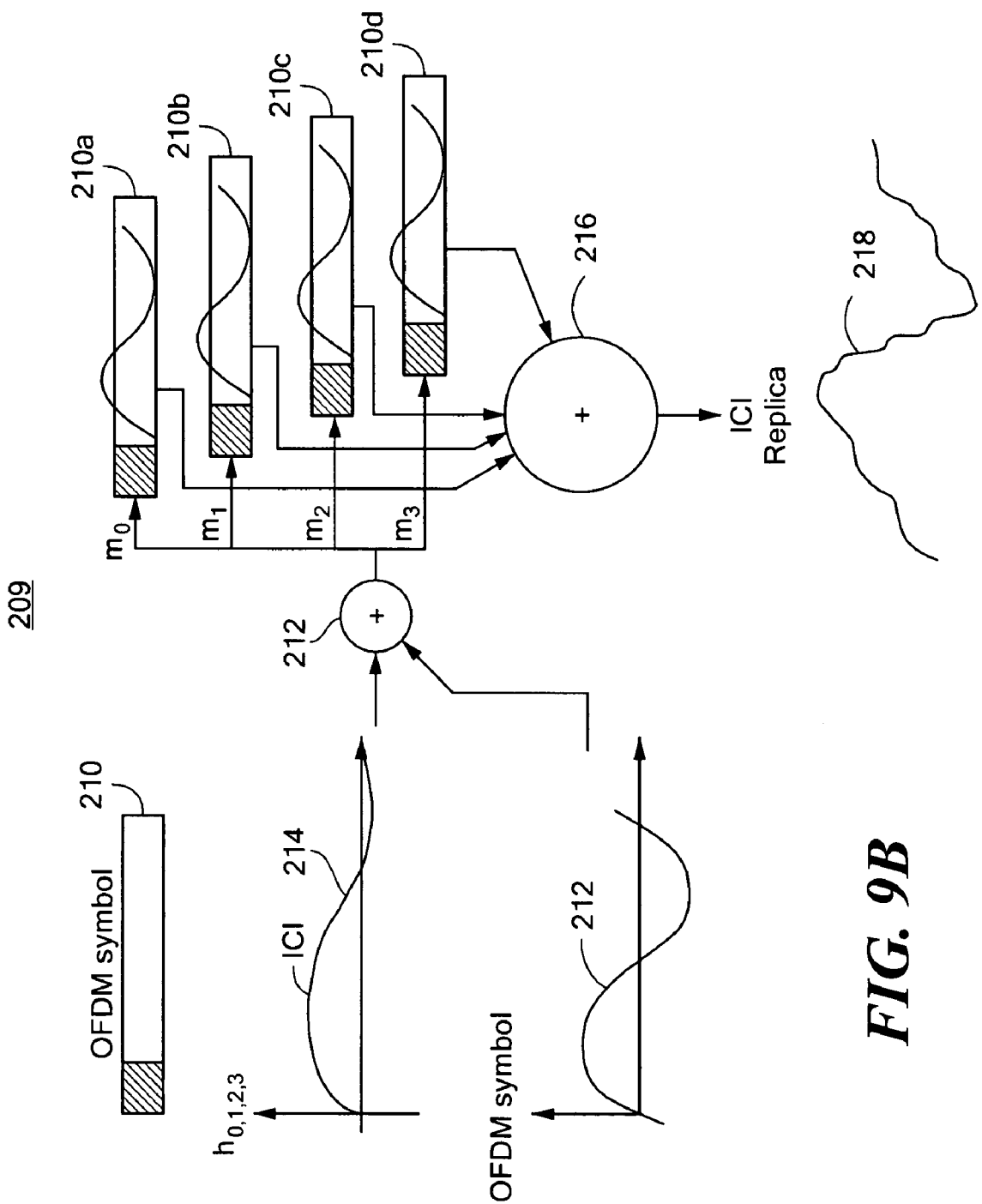
FIG. 9B is a graphical illustration of the distortion or adjusting of an OFDM symbol according to the associated delay and gain referred to in FIG. 9.

This is shown graphically in FIG. 9A where the inserted carrier data estimation and pilots are shown at 198 along with carrier data labeled $a_0$-$a_{n-3}$ and null carriers 200 indicated by zeros. After this FIG. 9, FFT is performed 202 and then ICI distortion is accomplished 204 and the results are summed 206. The ICI distortion is accomplished by a local OFDM symbol replica generator 209 as shown in FIG. 9B. OFDM symbol 210 represented as OFDM symbol sine wave 212 is multiplied by the ICI average free gain curve 214 associated path delay curvature. Each of the phases $m_0$ through $m_3$ is shifted. The shifted forms of OFDM symbol are multiplied 212 by each of the ICI average free gains $h_0$, $h_1$, $h_2$, $h_3$, represented as one curve at 214. The multiplication occurs in multiplier 212 and each of the waves, phase shifted by their phase $m_0$-$m_3$ is presented at 210a, 210b, 210c, 210d, respectively. These are then summed 216 to generate the ICI replica 218.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A channel estimator system for high mobility OFDM channels comprising:
    a path delay estimator circuit, responsive to an OFDM symbol stream including carrier data, inter-channel interference noise and channel noise for identifying a set of channel path delays;
    an average channel estimator circuit, responsive to the OFDM symbol stream and the identified set of channel path delays, for determining the average channel impulse response for the identified set of channel path delays in each symbol;
    a storage circuit for storing the average channel impulse responses for the identified channel path delays;
    a curve generator circuit, responsive to said stored average channel impulse responses, for generating a path delay curvature for each channel path delay in each symbol;
    a carrier data estimator circuit, responsive to the OFDM symbol stream and said average impulse responses from said average channel estimator circuit, for estimating the carrier data in the symbols in the OFDM symbol stream in the presence of inter-channel interference and channel noise;
    a regenerator circuit, responsive to said curve generator, and path delay estimator circuit and carrier data estimation circuit, for reconstructing said inter-channel interference noise; and a subtraction circuit for subtracting said reconstructed inter-channel interference noise from said OFDM symbol stream resulting in a symbol stream of carrier data and channel noise with suppressed inter-channel interference noise.

2. The channel estimator system of claim 1 in which said path delay estimator circuit identifies a set of channel path delays which are above a predetermined energy threshold.

3. The channel estimator system of claim 1 in which said regenerator circuit includes a local OFDM symbol generator, responsive to said estimated carrier data from said carrier estimator circuit to generate locally OFDM symbol replicas.

4. The channel estimator system of claim 3 in which said regenerator circuit includes an ICI distortion generator for shifting an OFDM symbol replica by each associated channel path delay, multiplying it by the associated path delay curvature and summing the shifted, multiplied symbol replicas to produce local inter-channel interference noise.

5. The channel estimator system of claim 1 in which said curve generator circuit includes a selection circuit for selecting from said storage circuit the average channel gains of neighboring OFDM symbols.

6. The channel estimator system of claim 5 in which said curve generator circuit includes a rate determining circuit for determining the rate of change of the neighboring average channel gains.

7. The channel estimator system of claim 6 in which said curve generator circuit includes a model selection circuit for identifying a best fit average free curve for the stored channel impulse responses.

8. The channel estimator system of claim 1 in which said carrier data estimator circuit includes an FFT circuit for performing FFT on a received OFDM symbol.

9. The channel estimator system of claim 8 in which said carrier data estimator circuit includes a vector generating circuit for creating a vector with zeros and inserting average path gains in associated delay locations.

10. The channel estimator system of claim 9 in which said carrier data estimator circuit includes a second FFT circuit for performing FFT on said vector.

11. The channel estimator system of claim 10 in which said carrier data estimator circuit includes an averaging circuit for calculating noise level.

12. The channel estimator system of claim 11 in which said carrier data estimator circuit includes an equalization circuit for calculating equalization coefficients in response to said second FFT circuit and said averaging circuit and applying them to the associated symbol.

13. The channel estimator system of claim 12 in which said carrier data estimator circuit includes a slicer circuit for matching the equalized symbols to a predefined grid of levels.

14. The channel estimator system of claim 1 in which said path delay estimator circuit includes an FFT circuit for performing FFT on an OFDM symbol.

15. The channel estimator system of claim 14 in which said path delay estimator circuit includes a normalizing circuit for extracting the channel frequency response for known carriers and inserting zeros for unknown carriers.

16. The channel estimator system of claim 15 in which said path delay estimator circuit includes an IFFT for performing IFFT on the channel frequency response.

17. The channel estimator system of claim 16 in which said path delay estimator circuit includes a noise estimator circuit for determining the channel noise level.

18. The channel estimator system of claim 17 in which said path delay estimator circuit includes a threshold setting circuit for setting a threshold for groups of channel path delays in accordance with their energy levels.

19. The channel estimator system of claim 18 in which said path delay estimator circuit includes a threshold circuit for selecting channel path delays meeting a predetermined threshold.

20. The channel estimator system of claim 1 in which said average channel estimator circuit includes an FFT circuit for performing an FFT on an OFDM symbol.

21. The channel estimator system of claim 20 in which said average channel estimator circuit includes a normalizing circuit for extracting the channel frequency response for known carriers.

22. The channel estimator system of claim 20 in which said average channel estimator circuit includes an estimator circuit for determining average path gains based on least squares and known noise.

23. A channel estimation method for high mobility OFDM channels comprising:

identifying a set of channel path delays from an OFDM symbol stream including carrier data, inter-channel interference noise and channel noise;

determining the average channel impulse response for the identified set of channel path delays in each symbol;

storing the average channel impulse responses for the identified channel path delays;

generating a path delay curvature for each channel path delay in each symbol based on stored average channel impulse responses for the identified channel path delays;

estimating the carrier data in the symbols in the OFDM symbol stream in the presence of inter-channel interference noise and channel noise from the OFDM symbol stream and said average impulse responses for the identified channel path delays;

reconstructing the inter-channel interference noise in response to the path delay curvature, the identified set of channel path delays and estimated carrier data; and subtracting the reconstructed inter-channel interference noise from the OFDM symbol stream to produce a symbol stream of carrier data and channel noise with suppressed inter-channel interference noise.

24. The channel estimation method of claim 23 in which said identified set of channel path delays is above a predetermined level of energy.

25. The channel estimation method of claim 23 in which reconstructing the inter-channel interference noise includes generating locally OFDM symbol replicas from said estimated carrier data.

26. The channel estimation method of claim 25 in which reconstructing the inter-channel interference noise further includes shifting an OFDM symbol replica by each associated channel path delay, multiplying it by the associated path delay curvature and summing the shifted, multiplied symbol replicas to produce local inter-channel interface noise.

27. The channel estimation method of claim 23 in which generating a path delay curvature includes averaging the channel gains of neighboring OFDM symbols.

28. The channel estimation method of claim 27 in which generating a path delay curvature further includes determining the rate of change of the neighboring average channel gains.

29. The channel estimation method of claim 28 in which generating a path delay curvature further includes identifying a best fit average free curve for the stored channel impulse responses.

30. The channel estimation method of claim 23 in which estimating the carrier data includes performing FFT on a received OFDM symbol.

31. The channel estimation method of claim 30 in which estimating the carrier data further includes creating a vector with zeros and inserting average path gains in associated delay locations.

32. The channel estimation method of claim 31 in which estimating the carrier data further includes performing FFT on said vector.

33. The channel estimation method of claim 32 in which estimating the carrier data further includes calculating noise level.

34. The channel estimation method of claim 33 in which estimating the carrier data further includes calculating equalization coefficients in response to said performing FFT on said vector and applying them to the associated symbol.

35. The channel estimation method of claim 34 in which estimating the carrier data further includes matching the equalized symbols to a predefined grid of levels.

36. The channel estimation method of claim 23 in which identifying a set of path delays includes performing FFT on an OFDM symbol.

37. The channel estimation method of claim 36 in which identifying a set of path delays further includes extracting the channel frequency response for known carriers and inserting zeros for unknown carriers.

38. The channel estimation method of claim 37 in which identifying a set of path delays further includes performing IFFT on the channel frequency response.

39. The channel estimation method of claim 38 in which identifying a set of path delays further includes determining the channel noise level.

40. The channel estimation method of claim 39 in which identifying a set of path delays further includes setting a threshold for groups of channel path delays in accordance with their energy levels.

41. The channel estimation method of claim 40 in which identifying a set of path delays further includes selecting channel path delays meeting a predetermined threshold.

42. The channel estimation method of claim 23 in which determining the impulse response includes performing an FFT on an OFDM symbol.

43. The channel estimation method of claim 42 in which determining the impulse response further includes a extracting the channel frequency response for known carriers.

44. The channel estimation method of claim 43 in which determining the impulse response further includes determining average path gains based on least squares and known noise.

* * * * *